United States Patent
Kwon et al.

(10) Patent No.: US 10,056,603 B2
(45) Date of Patent: Aug. 21, 2018

(54) METHOD OF PREPARING HETEROATOM-DOPED CARBON NANOMATERIAL

(71) Applicant: UNIST(ULSAN NATIONAL INSTITUTE OF SCIENCE AND TECHNOLOGY), Ulsan (KR)

(72) Inventors: Tae-Hyuk Kwon, Ulsan (KR); Hyuntak Kim, Ulsan (KR)

(73) Assignee: UNIST (Ulsan National Institute of Science and Technology), Ulsan (KR)

( * ) Notice: Subject to any disclaimer, the term of this patent is extended or adjusted under 35 U.S.C. 154(b) by 0 days.

(21) Appl. No.: 15/645,933

(22) Filed: Jul. 10, 2017

(65) Prior Publication Data

US 2018/0145310 A1  May 24, 2018

(30) Foreign Application Priority Data

Nov. 18, 2016 (KR) .......................... 10-2016-0154445

(51) Int. Cl.
| | |
|---|---|
| *B05D 3/00* | (2006.01) |
| *H01M 4/04* | (2006.01) |
| *H01M 4/583* | (2010.01) |
| *H01G 11/70* | (2013.01) |
| *H01G 11/36* | (2013.01) |

(52) U.S. Cl.
CPC .......... *H01M 4/0419* (2013.01); *H01G 11/36* (2013.01); *H01G 11/70* (2013.01); *H01M 4/583* (2013.01)

(58) Field of Classification Search
CPC .... H01M 4/0419; H01M 4/583; H01G 11/36; H01G 11/70
See application file for complete search history.

(56) References Cited

U.S. PATENT DOCUMENTS

| | | | |
|---|---|---|---|
| 8,722,442 B2 | 5/2014 | Kim et al. | |
| 9,472,675 B2 * | 10/2016 | Cho | ................. H01L 29/78684 |
| 2014/0141355 A1 * | 5/2014 | Huang | .................. H01G 11/38 429/482 |
| 2014/0322609 A1 | 10/2014 | Choi et al. | |

FOREIGN PATENT DOCUMENTS

| | | |
|---|---|---|
| KR | 10-2012-0070973 A | 7/2012 |
| KR | 10-2013-0061115 A | 6/2013 |
| KR | 10-2015-0111668 | 10/2015 |

OTHER PUBLICATIONS

Korean Intellectual Property Office, Office Action, dated May 14, 2018, issued in Korean Application No. 10-2016-0154445.

* cited by examiner

*Primary Examiner* — Michael P Wieczorek
(74) *Attorney, Agent, or Firm* — Klarquist Sparkman, LLP

(57) ABSTRACT

Provided is a method of preparing a heteroatom-doped carbon nanomaterial. The method includes preparing a dispersion solution by dispersing a carbon nanomaterial in a solvent, forming first droplets by spraying the dispersion solution via an ultrasonic spray nozzle, and forming second droplets including a heteroatom-doped carbon nanomaterial by supplying a gas to the first droplets to dope the first droplets with an element included in the gas.

11 Claims, 4 Drawing Sheets

METHOD OF PREPARING HETEROATOM-DOPED CARBON NANOMATERIAL

CROSS-REFERENCE TO RELATED APPLICATION

This application claims the benefit of Korean Patent Application No. 10-2016-0154445, filed on Nov. 18, 2016, in the Korean Intellectual Property Office, the disclosure of which is incorporated herein in its entirety by reference.

BACKGROUND

1. Field

One or more embodiments relate to a method of preparing a heteroatom-doped carbon nanomaterial, and more particularly, to a preparation method whereby a heteroatom-doped carbon nanomaterial may be mass-produced at a high doping concentration.

2. Description of the Related Art

Carbon nanomaterials are used in various fields such as nanoscale electronic devices, sensors, high-performance composites, and the like due to their very excellent mechanical properties, electrical selectivity, field emission properties, and the like. Non-limiting examples of such carbon nanomaterials include graphene, carbon nanotubes, and carbon nanofibers.

In addition, carbon nanomaterials may be doped with a heteroatom to thereby further enhance their functional properties. For example, nitrogen-doped graphene has a high surface area, highly electrical conductivity, and conjugation between an unshared electron pair of nitrogen and the π-orbital of graphene.

Graphene has received much attention as a carbon electrode material, and a representative example of an electrode material is reduced graphene oxide (rGO). When such rGO is doped with a heteroatom, electrical properties such as sheet resistance, charge mobility, and the like thereof may be enhanced as described above.

As methods of doping graphene, rGO, or the like with a heteroatom, chemical vapor deposition (CVD), thermal treatment, plasma treatment, and the like are widely used. Korean Patent Application Publication No. 2015-0111668 schematically describes these methods.

Among the above-described methods, CVD is advantageous in that high-purity graphene with relatively less binding may be obtained, but is fairly inconvenient in that heteroatom-doped graphene can be grown only on a particular metal-deposited surface and subsequently grown graphene must be transferred to a desired substrate. In addition, CVD requires a relatively high manufacturing cost.

In thermal treatment, graphene oxide is mainly used, and thus even though graphene oxide is reduced, it is difficult to obtain the intrinsically high charge mobility of graphene in the resulting graphene.

Meanwhile, plasma treatment is advantageous in that large-area high-quality graphene grown by CVD can be electron-doped, but has a problem in that electrical properties of graphene may significantly deteriorate due to a plurality of carbon-oxygen bonds formed in graphene as a byproduct of the plasma treatment.

Thus, the above-described conventional doping methods have limitations when used for mass production of high-quality heteroatom-doped graphene compounds.

RELATED ART DOCUMENTS

Patent Document

Korean Patent Application Publication No. 2015-0111668 (Oct. 6, 2015)

SUMMARY

The present disclosure has been made to address several problems including the above-described problems, and it is an object of the present disclosure to provide preparation methods whereby a heteroatom-doped carbon nanomaterial may be mass-produced at a high doping concentration. However, these technical goals are provided only for illustrative purposes and are not intended to limit the scope of the invention.

Additional aspects will be set forth in part in the description which follows and, in part, will be apparent from the description, or may be learned by practice of the presented embodiments.

According to one or more embodiments, a method of preparing a heteroatom-doped carbon nanomaterial includes preparing a dispersion solution by dispersing a carbon nanomaterial in a solvent, forming first droplets by spraying the dispersion solution via an ultrasonic spray nozzle, and forming second droplets including a heteroatom-doped carbon nanomaterial by supplying a gas to the first droplets to dope the first droplets with an element included in the gas.

The method may further include transferring the second droplets onto a substrate by using the gas.

The second droplets may reach the substrate by being transferred by the gas in a direction different from a direction in which the first droplets are sprayed.

The substrate may include a metal layer.

The method may further include forming a conductive material layer on the substrate.

The conductive material layer may include at least one selected from carbon nanotubes, carbon nanofibers, metal nanowires, and conductive polymers.

The method may further include performing sonication on the dispersion solution before the spraying of the dispersion solution via an ultrasonic spray nozzle.

The solvent may include at least one selected from N-methylpyrrolidone (NMP), dimethylformamide (DMF), dimethylsulfoxide (DMSO), and ethanol.

Ultrasonic waves generated from the ultrasonic spray nozzle may have a maximum frequency of about 180 kHz or more.

The carbon nanomaterial may include at least one selected from reduced graphene oxide (rGO), carbon nanotubes, carbon nanofibers, graphite, and activated carbon.

The gas may include at least one selected from nitrogen, oxygen, an inert element, and a halogen element.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
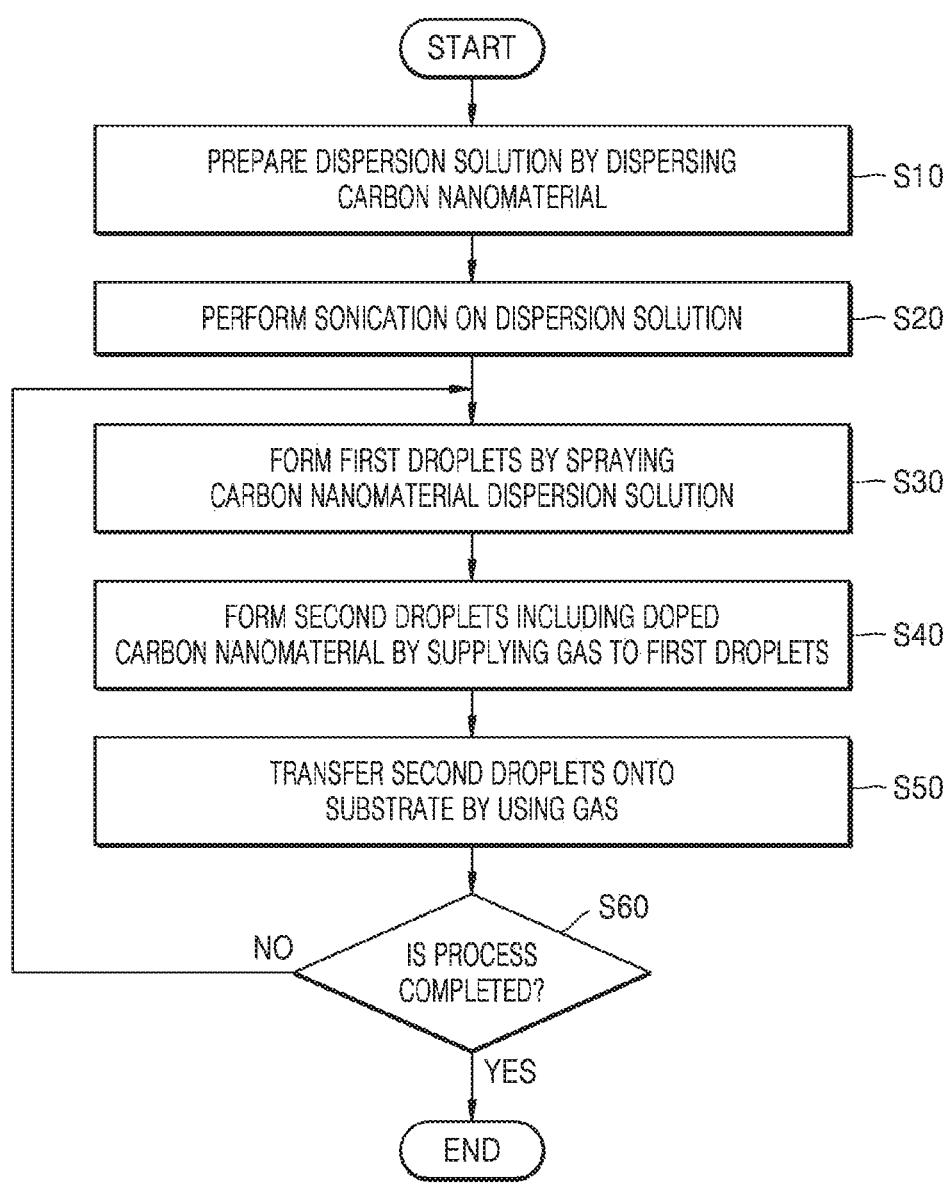
FIG. 1 is a flowchart schematically illustrating a method of preparing a heteroatom-doped carbon nanomaterial, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

As the invention allows for various changes and numerous embodiments, particular embodiments will be illustrated in the drawings and described in detail in the written description. However, this is not intended to limit the invention to particular modes of practice, and it is to be understood that all changes, equivalents, and substitutes that do not depart from the spirit and technical scope of the invention are encompassed in the invention. In the description of the invention, certain detailed explanations of related art are omitted when it is deemed that they may unnecessarily obscure the essence of the invention.

While such terms as "first," "second," and the like used in the present specification may be used to describe various components, such components must not be limited to the above terms. The above terms are used only to distinguish one component from another.

In the present specification, an x-axis, a y-axis, and a z-axis are not limited to the three axes on an orthogonal coordinates system, and can be interpreted in a broad sense including the same. For example, the x-, y- and z-axes may be orthogonal to one another, but may refer to different directions that are not perpendicular to one another.

Hereinafter, embodiments of the present disclosure will be described in detail with reference to the accompanying drawings. In description with reference to the drawings, like reference numerals denote substantially like or corresponding elements and a detailed description thereof will be provided only once. Thicknesses of various layers and regions in the drawings are exaggerated for clear illustration. In addition, in the drawings, thicknesses of some layers and regions are exaggerated for convenience of explanation.

FIG. 1 is a flowchart schematically illustrating a method of preparing a heteroatom-doped reduced graphene oxide, according to an embodiment.

According to an embodiment, the carbon nanomaterial of the FIG. 1 may be reduced graphene oxide (rGO). However, the present disclosure is not limited to the above, and the carbon nanomaterial of the FIG. 1 may be carbon nanotubes, carbon nanofibers, graphite, activated carbon, or the like. Hereinafter, it is assumed that the carbon nanomaterial is reduced graphene oxide (rGO) for convenience of explanation.

Referring to FIG. 1, the method of preparing a heteroatom-doped reduced graphene oxide, according to an embodiment, includes: preparing a dispersion solution by dispersing reduced graphene oxide (rGO) in a solvent (operation S10); forming first droplets by spraying the dispersion solution via an ultrasonic spray nozzle (operation S30); and forming second droplets including a heteroatom-doped rGO by supplying a gas to the first droplets to dope the first droplets with an element included in the gas (operation S40).

In particular, first, rGO is dispersed in a solvent to prepare a dispersion solution (operation S10).

In operation S10, the solvent for dispersing rGO may include at least one selected from N-methylpyrrolidone (NMP), dimethylformamide (DMF), dimethylsulfoxide (DMSO), and ethanol. The solvent is not limited to the above examples, and solvents in various forms may be used to accelerate and stabilize the dispersion of the rGO.

Subsequently, the dispersion solution may be subjected to sonication (operation S20).

Through operation S20, the dispersion solution may be kept in a dispersion state for about 5 hours to about 24 hours. Thus, while the dispersion solution is sprayed via an ultrasonic spray nozzle, the rGO in the dispersion solution does not precipitate and, accordingly, manufacturing processes may be performed a plurality of times for a long period of time.

However, operation S20 may be omitted according to manufacturing applications, manufacturing conditions, and the like. When operation S20 is omitted, a dispersion solution spraying process, which will be described below (operation S30), is performed directly after the dispersion preparation process described above (operation S10).

Subsequently, the dispersion solution is sprayed via an ultrasonic spray nozzle to form first droplets (operation S30).

In operation S30, the dispersion solution is introduced into the ultrasonic spray nozzle and sprayed to the outside via an outlet of the ultrasonic spray nozzle, and the solution sprayed to the outside is in droplet form. That is, the dispersion solution is atomized by ultrasonic energy in a process of passing through the ultrasonic spray nozzle to form fine first droplets having a uniform size distribution. Also, in operation S30, the rGO constituting the first droplets may maintain a state in which it is uniformly dispersed in a solvent.

Subsequently, a gas is supplied to the first droplets to form second droplets including a heteroatom-doped rGO (operation S40).

In operation S40, the gas supplied to the first droplets may include at least one selected from nitrogen, oxygen, an inert element, and a halogen element. For example, the gas may include nitrogen or oxygen and, in this case, rGO constituting the first droplets may be doped with a heteroatom of nitrogen or oxygen included in the gas to form a nitrogen-doped reduced graphene oxide (N-rGO) or an oxygen-doped reduced graphene oxide (O-rGO).

Such doped rGOs are in droplet form. In particular, in operation S30, the first droplets activated by ultrasonic energy collide with a heteroatom included in the supplied gas and, accordingly, the heteroatom is instantaneously doped in the rGO constituting the first droplets. That is, since the doping process is performed within a very short period of time, second droplets are formed in which a heteroatom is doped in the rGO included in the first droplets in a state in which a droplet form is maintained. In this case, to facilitate doping by sufficient activation of the first droplets, in operation S30, ultrasonic waves may have a maximum frequency of about 180 kHz or more.

Subsequently, the second droplets are transferred onto a substrate by using a gas (operation S50).

The gas of operation S50 serves as both a doping gas of operation S40 and a carrier gas. That is, in operation S50, the second droplets reach the substrate by being transferred by a doping gas supplied in operation S40 onto a substrate which is a basal layer.

In this regard, the substrate may be a polymer base coated with at least one selected from copper, nickel, stainless steel, titanium, aluminum, carbon-coated aluminum, a nickel foaming agent, a copper foaming agent, and a conductive metal. For example, when a battery, a capacitor, or the like is manufactured using a heteroatom-doped rGO, the substrate may act as a charge collector.

The substrate may be pre-heated so as to easily form, on an upper portion thereof, a heteroatom-doped rGO layer. In this case, a preheating temperature thereof or a temperature thereof during manufacturing processes may be about 150° C.

As described above, in operation S50, the second droplets are transferred onto a substrate by the doping gas. In particular, the doping gas changes a transfer direction of the second droplets that is identical or similar to that of the first droplets to drop the second droplets on the substrate. Thus, a direction of spraying of the first droplets via the ultrasonic spray nozzle in operation S30 may be different from the direction in which the doping gas transfers the second droplets.

After the above-described processes (operation S10 to operation S50), it is determined whether a process of forming a heteroatom-doped rGO layer has been completed (operation S60). That is, the above-described processes (operation S10 to operation S50) may be repeated or ended by determining whether the resulting heteroatom-doped rGO layer is formed to a desired thickness, area, or the like.

Figure 2:
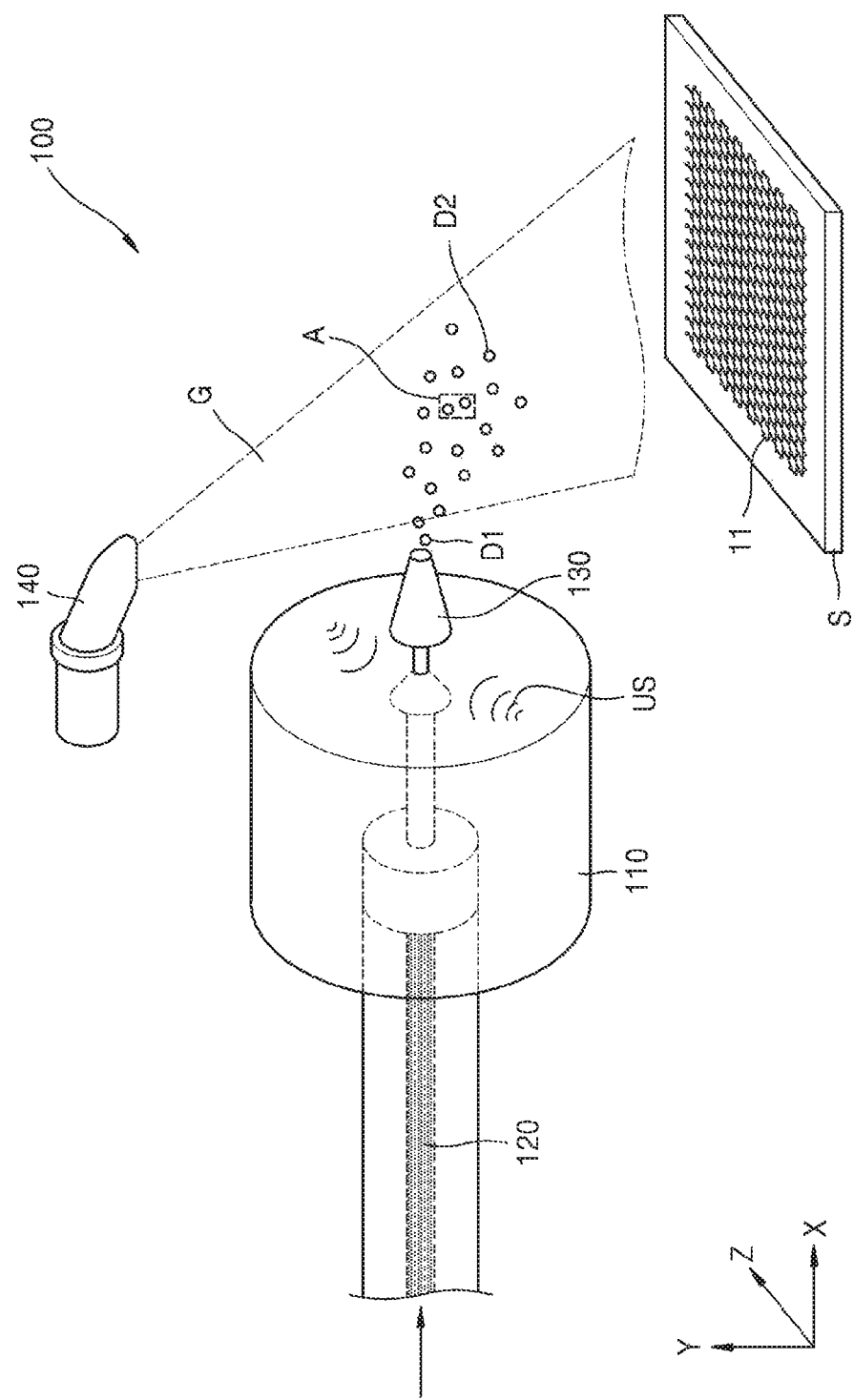
FIG. 2 is a schematic conceptual diagram illustrating an apparatus and a method of preparing a heteroatom-doped carbon nanomaterial, according to embodiments.
Figure 3:
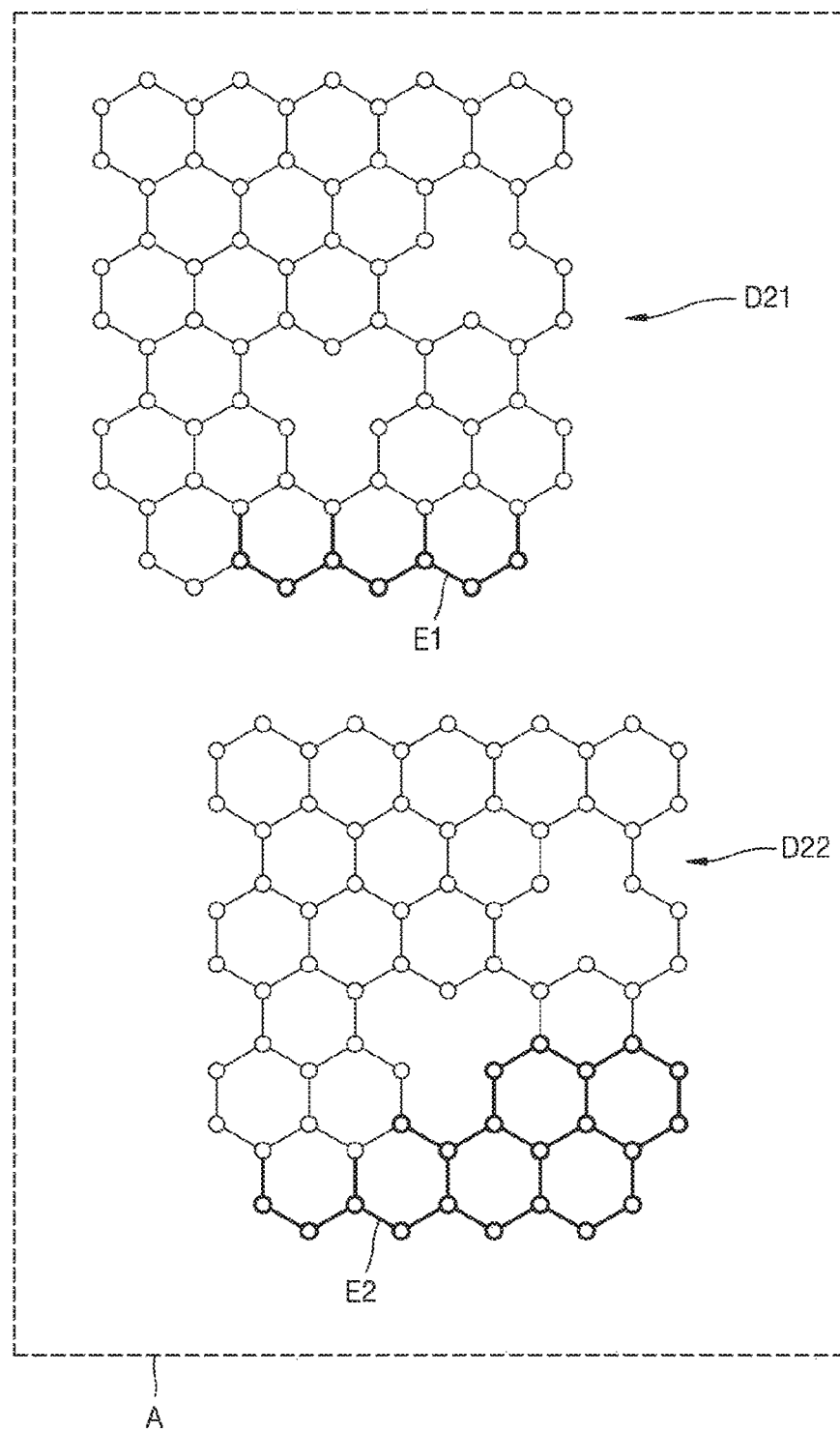
FIG. 3 is a schematic enlarged view of portion A of FIG. 2.

FIG. 2 is a schematic conceptual diagram illustrating an apparatus 100 and a method of preparing a heteroatom-doped rGO, according to embodiments. FIG. 3 is a schematic enlarged view of portion A of FIG. 2.

Referring to FIGS. 1 and 2, the apparatus 100 for preparing a heteroatom-doped rGO, according to an embodiment, may include an ultrasonic wave generator 110, a dispersion solution flow channel 120, an ultrasonic spray nozzle 130, and a gas discharger 140.

The ultrasonic wave generator 110 generates ultrasonic waves US to convert the dispersion solution into a droplet form in the forming of the first droplets (operation S30). As described above, the ultrasonic waves US generated may have a maximum frequency of about 180 kHz or more.

The dispersion solution flow channel 120 acts as a path through which the dispersion solution including rGO is introduced into the apparatus 100, and the introduced dispersion solution is sprayed to the outside via the ultrasonic spray nozzle 130. In this case, the dispersion solution is converted into a droplet form by energy of the ultrasonic waves US generated by the ultrasonic wave generator 110, thereby forming first droplets D1.

The first droplets D1 are sprayed in a direction parallel to a surface of a substrate S, i.e., a +X direction. As used herein, the expression "direction parallel to a surface of a substrate S" may mean a length direction of the substrate S. Thus, the first droplets D1 are discharged from the ultrasonic spray nozzle 130 and proceed approximately in a +X direction.

The first droplets D1 sprayed via the ultrasonic spray nozzle 130 are activated by energy of the ultrasonic waves US, and in this case, edges of the rGO constituting the first droplets D1 are easily activated. Subsequently, while continuously proceeding approximately in a +X direction, the first droplets D1 react with a gas G discharged from the gas discharger 140, and in this process, a heteroatom included in the gas G is doped in activated portions of the first droplets D1. Consequently, second droplets D2 including a heteroatom-doped rGO are formed.

Referring to FIG. 3, a heteroatom may be doped in edges of the heteroatom-doped rGO constituting the second droplets D2. That is, referring to the enlarged view of two droplets D21 and D22 selected from among the second droplets D2 illustrated in FIG. 2, a heteroatom may be doped in edges E1 and E2 of the heteroatom-doped rGOs constituting the two droplets D21 and D22. In this case, one (e.g., D22) of the two droplets D21 and D22 may be in a more activated state than the other (e.g., D21) thereof and, accordingly, the one droplet D22 may be doped more with a heteroatom than the other droplet D21.

For example, as illustrated in FIG. 3, when a heteroatom doped in the edges E1 and E2 is nitrogen, nitrogen having one more electron than carbon combines with graphene composed of carbon atoms and, as a result, the rGO has enhanced electrical conductivity, ionic binding properties, and the like, and also has an increased specific surface area. Thus, the heteroatom-doped rGO prepared as described above may be used in various fields, for example, in storage devices such as batteries, capacitors, and the like, as well as in catalysts, conductive films, and the like.

Referring back to FIG. 2, the second droplets D2 are transferred onto the substrate S by the gas G to thereby form, on the substrate S, a heteroatom-doped rGO layer 11. In this regard, to reach the substrate S, the second droplets D2 are guided by the gas G in a direction different from a direction (+X direction) in which the first droplets D1 are sprayed. For this, the gas G may be discharged from the gas discharger 140 in a direction facing the substrate S and, to adjust a direction of discharging the gas S, a discharging hole (not shown) of the gas discharger 140 may be inclined at a certain angle with respect to the substrate S.

Figure 4:
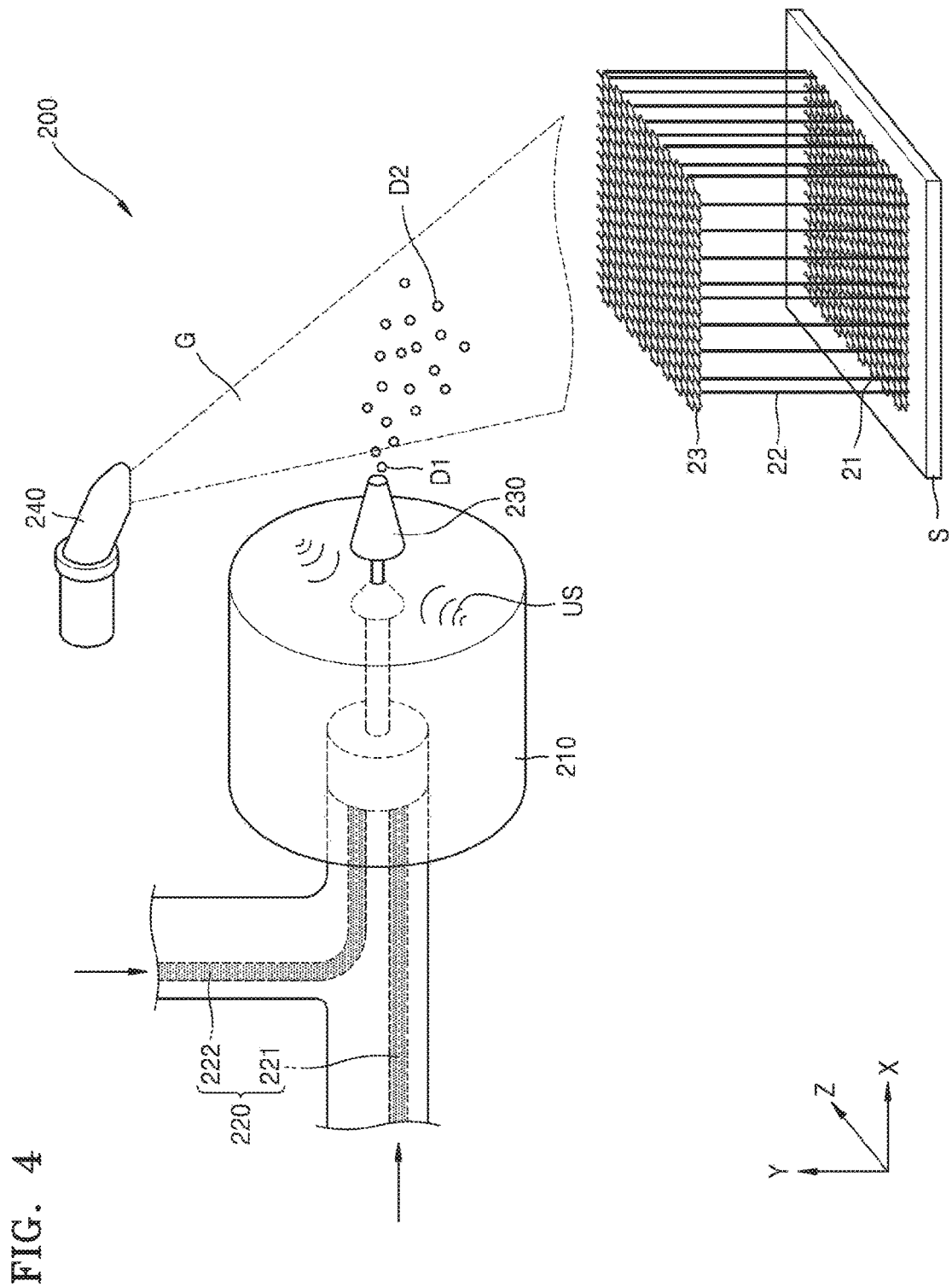
FIG. 4 is a schematic conceptual diagram illustrating an apparatus and a method of preparing a heteroatom-doped carbon nanomaterial, according to other embodiments.

FIG. 4 is a schematic conceptual diagram illustrating an apparatus 200 and method of preparing a heteroatom-doped rGO, according to other embodiments.

Referring to FIG. 4, the apparatus 200 for preparing a heteroatom-doped rGO, according to another embodiment, may include an ultrasonic wave generator 210, a dispersion solution flow channel 220, an ultrasonic spray nozzle 230, and a gas discharger 240. Structures and functions of the ultrasonic wave generator 210, the ultrasonic spray nozzle 230, and the gas discharger 240 may be the same as those of the previous embodiment illustrated in FIG. 2, while the dispersion solution flow channel 220 is structurally different from the previous embodiment. Thus, only the dispersion solution flow channel 220 will now be described, and a detailed description of the remaining elements will not be provided again herein.

As illustrated in FIG. 4, the dispersion solution flow channel 220 may include a first dispersion solution flow channel 221 and a second dispersion solution flow channel 222. In this regard, a solution prepared by dispersing rGO in a solvent is introduced into the first dispersion solution flow channel 221 as in the previous embodiment, and a dispersion solution including another material is introduced into the second dispersion solution flow channel 222. For example, a dispersion solution, in which at least one conductive material selected from carbon nanotubes, carbon nanofibers, metal nanowires, and conductive polymers is dispersed, may be introduced into the second dispersion solution flow channel 222.

By using the apparatus 200 including an ultrasonic spray nozzle capable of spraying at least two materials as described above, sequentially sprayed dispersion solutions may be transferred in a droplet form onto the substrate S, thereby forming a stacked structure of heteroatom-doped rGO layers 21 and 23 and a separate conductive material layer 22. In this case, the heteroatom-doped rGO layers 21 and 23 and the conductive material layer 22 may be alternately stacked by alternately introducing the respective dispersion solutions into the nozzle. In addition, a stacking order of the heteroatom-doped rGO layers 21 and 23 and the conductive material layer 22 may vary. That is, the heteroatom-doped rGO layers 21 and 23 may be formed as the lowermost layers, and the conductive material layer 22 may be disposed thereabove. In an opposite way, the conductive material layer 22 may be formed as the lowermost layer, and the heteroatom-doped rGO layers 21 and 23 may be disposed thereabove.

The number of dispersion solution flow channels is not necessarily limited to 2, and may be greater than two according to the number of materials stacked. In addition, unlike what is illustrated in FIG. 4, in addition to the number of dispersion solution flow channels, the number of ultrasonic spray nozzles may two or more. In addition, a thickness, density, area, or the like of each layer may be variously changed by adjusting the number of sprays via each nozzle, an amount of dispersion solution introduced, an angle of discharging a gas, or the like.

Although a case has been mainly described above in which rGO is a material sprayed via an ultrasonic spray nozzle to be doped, the present disclosure is not particularly limited thereto. For example, in addition to rGO, the material to be doped may be carbon nanotubes, carbon nanofibers, graphite, activated carbon, or the like.

For reference, when graphite (GR), reduced graphene oxide (rGO), carbon nanotubes (CNTs), and activated carbon (AC) are doped with nitrogen N by using the above-described preparation methods, amounts of a heteroatom before and after doping for each case are as shown in Table 1 below. In this case, an experiment was conducted using an ultrasonic wave frequency of 120 kHz, an ultrasonic wave power of 240 W, a discharge pressure of nitrogen and oxygen gases as doping gases of 3.0 psi, a flow rate of a dispersion solution of 0.3 ml/min, an ultrasonic spray speed of 30 mm/sec, a spray area of 10 mm$^2$, and a temperature of a substrate of 150° C.

TABLE 1

|  | GR | | rGO | | CNT | | AC | (Unit: %) |
| --- | --- | --- | --- | --- | --- | --- | --- | --- |
|  | Before doping | After doping | Before doping | After doping | Before doping | After doping | Before doping | After doping |
| Carbon (C) | 99.48 | 92.18 | 91.19 | 80.70 | 84.47 | 78.12 | 99.99 | 95.16 |
| Nitrogen (N) | 0 | 3.29 | 0.72 | 9.45 | 0.10 | 4.57 | 0 | 2.55 |
| Oxygen (O) | 0 | 2.36 | 5.05 | 3.75 | 9.88 | 10.09 | 0 | 0.45 |
| Hydrogen (H) | 0.13 | 1.03 | 0.46 | 1.04 | 5.03 | 5.65 | 0 | 0.43 |

In addition, when GR, rGO, CNTs, and AC are doped with oxygen (O) under the same experimental conditions as in Table 1 above, amounts of a heteroatom before and after doping for each case are as shown in Table 2 below.

TABLE 2

|  | GR | | rGO | | CNT | | AC | (Unit: %) |
| --- | --- | --- | --- | --- | --- | --- | --- | --- |
|  | Before doping | After doping | Before doping | After doping | Before doping | After doping | Before doping | After doping |
| Carbon (C) | 99.48 | 88.34 | 91.19 | 74.33 | 84.47 | 72.06 | 99.99 | 94.27 |
| Nitrogen (N) | 0 | 0.97 | 0.72 | 2.52 | 0.10 | 0.41 | 0 | 0.54 |
| Oxygen (O) | 0 | 10.92 | 5.05 | 16.47 | 9.88 | 22.12 | 0 | 4.51 |
| Hydrogen (H) | 0.13 | 0.20 | 0.46 | 3.36 | 5.03 | 5.03 | 0 | 0.70 |

As a comparative example, when graphene is doped with nitrogen (N) by each of chemical vapor deposition (CVD), thermal treatment, and plasma treatment, an approximate range of the amount of nitrogen after doping for each case is as shown in Table 3 below.

TABLE 3

| | Amount of nitrogen (N) after doping | | (Unit: %) |
|---|---|---|---|
| | CVD | Thermal treatment | Plasma treatment |
| Nitrogen (N) | 4 to 13 | 2 to 4 | 1 to 2.5 |

Referring to Tables 1 and 3, it can be confirmed that the amount of nitrogen (N) doped using a method of preparing a heteroatom-doped carbon nanomaterial, according to an embodiment, is larger than that doped by thermal treatment and plasma treatment, and similar to that doped by CVD which enables high-concentration doping. In addition, from the results shown in Tables 1 and 2, it can be confirmed that other carbon nanomaterials such as carbon nanotubes, graphite, and activated carbon, as well as graphene and graphene oxide, are also doped with a heteroatom such as nitrogen (N) or oxygen (O) at a relatively high concentration.

Thus, a heteroatom may be easily doped in a carbon nanomaterial such as rGO or the like by using a preparation method according to an embodiment and, accordingly, a heteroatom-doped carbon nanomaterial may be mass-produced at a relatively high doping concentration. Therefore, high-quality electrode materials with enhanced electrical conductivity and ionic binding properties, and increased specific surface area, may be prepared with a low manufacturing cost within a short period of time.

As is apparent from the foregoing description, according to an embodiment of the present disclosure, a heteroatom-doped carbon nanomaterial may be mass-produced at a relatively high doping concentration. Thus, high-quality electrode materials with enhanced electrical conductivity and ionic binding properties, and increased specific surface area, may be prepared with a low manufacturing cost within a short period of time. However, the scope of the present disclosure is not limited by these effects.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A method of preparing a heteroatom-doped carbon nanomaterial, the method comprising:
   preparing a dispersion solution by dispersing a carbon nanomaterial in a solvent;
   forming first droplets by spraying the dispersion solution via an ultrasonic spray nozzle; and
   forming second droplets comprising a heteroatom-doped carbon nanomaterial by supplying a gas to the first droplets to dope the first droplets with an element included in the gas.

2. The method of claim 1, further comprising transferring the second droplets onto a substrate by using the gas.

3. The method of claim 2, wherein the second droplets reach the substrate by being transferred by the gas in a direction different from a direction in which the first droplets are sprayed.

4. The method of claim 2, wherein the substrate comprises a metal layer.

5. The method of claim 2, further comprising forming a conductive material layer on the substrate.

6. The method of claim 5, wherein the conductive material layer comprises at least one selected from carbon nanotubes, carbon nanofibers, metal nanowires, and conductive polymers.

7. The method of claim 1, further comprising performing sonication on the dispersion solution before the spraying.

8. The method of claim 1, wherein the solvent comprises at least one selected from N-methylpyrrolidone (NMP), dimethylformamide (DMF), dimethylsulfoxide (DMSO), and ethanol.

9. The method of claim 1, wherein ultrasonic waves generated from the ultrasonic spray nozzle have a maximum frequency of about 180 kHz or more.

10. The method of claim 1, wherein the carbon nanomaterial comprises at least one selected from reduced graphene oxide (rGO), carbon nanotubes, carbon nanofibers, graphite, and activated carbon.

11. The method of claim 1, wherein the gas comprises at least one selected from nitrogen, oxygen, an inert element, and a halogen element.

* * * * *